July 24, 1951 M. CAMRAS 2,561,338

BINAURAL MAGNETIC RECORDER

Filed Dec. 31, 1946 2 Sheets-Sheet 1

Inventor
MARVIN CAMRAS by The Firm of Charles W. Hills Attys.

Inventor
MARVIN CAMRAS
by [signature] Attys.

Patented July 24, 1951 2,561,338

UNITED STATES PATENT OFFICE 2,561,338

BINAURAL MAGNETIC RECORDER

Marvin Camras, Chicago, Ill., assignor to Armour Research Foundation of Illinois Institute of Technology, Chicago, Ill., a corporation of Illinois Application December 31, 1946, Serial No. 719,385

7 Claims. (Cl. 179—100.2)

This invention relates to magnetic recording and reproducing devices, and more particularly, to a binaural magnetic recorder and reproducer.

Binaural effects with magnetic recording and reproducing apparatus have been suggested in the past, such as the one described in the A. L. Curtis Patent No. 1,591,081, granted July 6, 1926.

The fundamental concept of a binaural system is to have a plurality of sound tracks which are recorded simultaneously through separate pick-up devices located at different points in space, and then playing back the recorded sound tracks with sound reproducing elements located at different points in space.

One of the principal features and objects of the present invention is to provide an improved binaural recording and reproducing means.

A further object of the present invention is to provide a binaural system in which the sound tracks are carried on a tape carrier, and in which half of the sound tracks are used by moving the tape in one direction and half of the sound tracks are used by moving the tape in the other direction.

Another object of the present invention is to provide novel head means for binaural recording and reproducing apparatus.

A still further object of the present invention is to provide a novel arrangement and structure of erasing means and magnetic recording and reproducing means.

The novel features which I believe to be characteristic of my invention are set forth with particularity in the appended claims. My invention itself, however, both as to its organization, manner of construction, and method of operation, together with further objects and advantages thereof, may best be understood by reference to the following description taken in connection with the accompanying drawings, in which:

Figure 1:
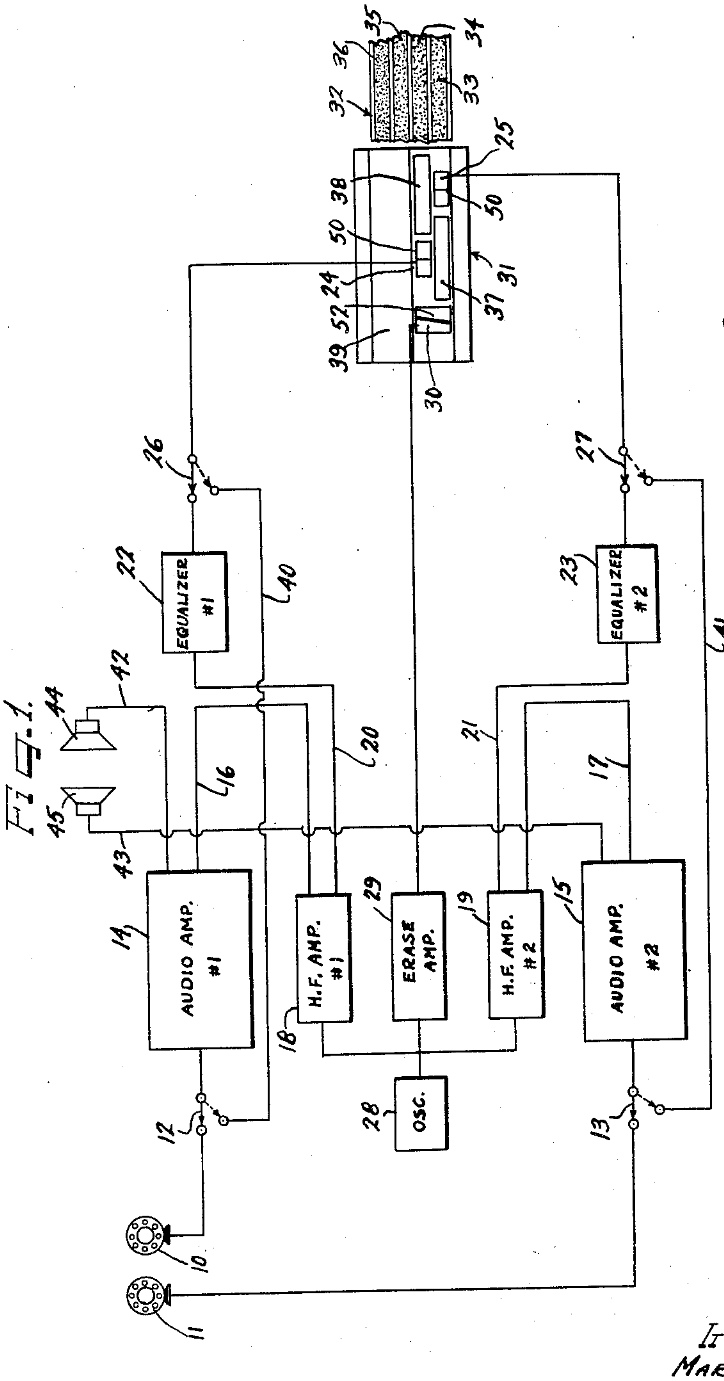
Figure 1 is a block diagram of a binaural magnetic recording system embodying the novel teachings and characteristics of the present invention.

In the binaural magnetic recording system illustrated in Figure 1 of the drawings, a pair of microphones 10 and 11 are arranged to pick up sound at two spaced points within range of the sound to be recorded. The microphones 10 and 11 are connected through suitable switches 12 and 13 to a pair of audio amplifiers 14 and 15, respectively. The outputs of these audio amplifiers 14 and 15 are connected through conductors 16 and 17 to two high frequency amplifiers 18 and 19, where the audio component is mixed with the high frequency component and then fed through conductors 20 and 21, respectively, and through equalizers 22 and 23 to electromagnetic transducer heads 24 and 25.

Suitable switches 26 and 27 are interposed in the circuit between the equalizers 22 and 23 and the electromagnetic transducer heads 24 and 25 for a reason which will presently be apparent.

A high frequency oscillator 28 is provided for supplying the high frequency component to the high frequency amplifiers 18 and 19, and this high frequency signal may vary in frequency throughout a wide range without departing from the spirit and scope of the present invention. By way of illustration, and not by way of limitation, this high frequency component may be in the order of 40 kilocycles.

The high frequency oscillator 28 also feeds into an erase amplifier 29, which, in turn, connects with the erase head 30 of the magnetic head assembly 31. This magnetic head assembly 31 includes the two electromagnetic transducer heads 24 and 25, as well as the erase head 30.

Figure 2:
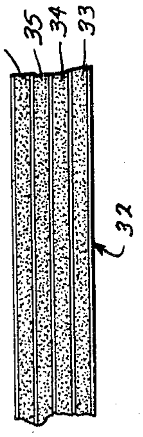
Figure 2 is a diagrammatic sketch of a four-lane tape used in connection with the system illustrated in Figure 1.

The recording is arranged to be made on a tape 32 (see Figure 2) which includes four sound tracks 33, 34, 35 and 36. These sound tracks are arranged to be used in pairs. As illustrated in Figures 1 and 2, the sound tracks 33 and 34 are arranged to be simultaneously recorded on when the tape is moved from left to right, while the tracks 35 and 36 are arranged to be recorded on when the ends of the tape have their positions reversed and the tape is then moved from right to left. This will be apparent from an inspection of the diagrammatic representation of the head assembly 31.

In addition to the heads 24, 25 and 30 in the head assembly 31, there is also provided three keepers 37, 38 and 39, which are formed of a high permeability, low coercive force material. The keeper 37 lies adjacent the head 24 and extends from a position near the erase head 30 to a position near the transducer head 25. The keeper 38 lies opposite the transducer head 25 and extends from the transducer head 24 to a position beyond the location of the head 25. The keeper 39 is of a width slightly greater than the two tracks 35 and 36 on the tape 32 and lies opposite the erase head 30, the transducer head 24, and the keeper 38. As will presently be explained, the use of these keepers in this head assembly tends to eliminate cross-talk and unwanted pick-up or play back between adjacent channels on the tape 32.

For reproducing purposes, the switches 12, 13, 26 and 27 are thrown from their full line positions to their dotted line positions, and this connects the transducer heads 24 and 25 to the input side of the audio amplifiers 14 and 15 through conductors 40 and 41, respectively.

The outputs of the audio amplifiers 14 and 15 are connected through conductors 42 and 43 to the two sound reproducing means 44 and 45, respectively. These sound reproducing means may be the two phone units of a head-phone set, or they may be two loud speakers located in spaced relationship so as to be located at the same two relative positions as the microphones 10 and 11, when the recording was made. The desired binaural effect will thereby be produced.

Figure 3:
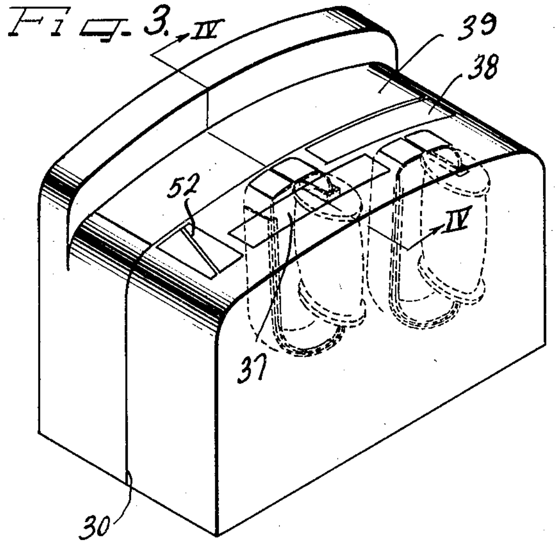
Figure 3 is an isometric view showing a magnetic head assembly for the binaural magnetic recording system of Figure 1.
Figures 4, 5, 7:
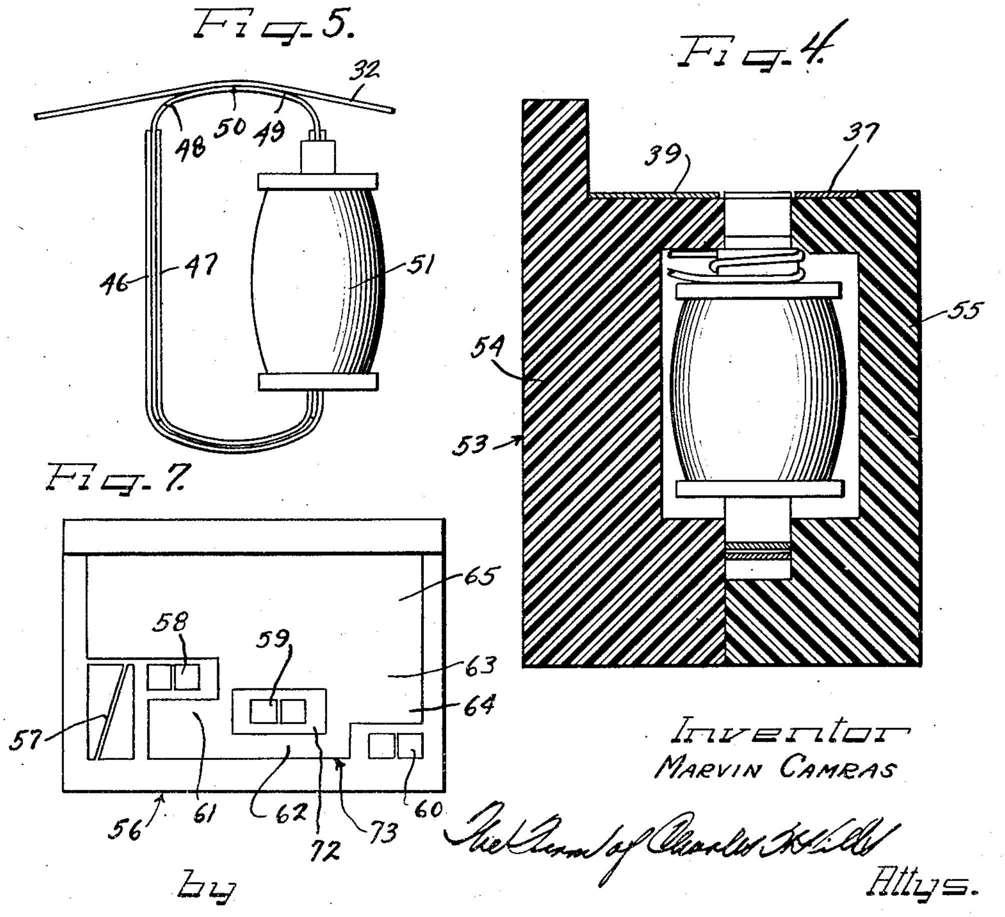
Figure 4 is a vertical sectional view taken along the line IV—IV of Figure 3.
Figure 5 is a front elevational view of one of the recording and reproducing heads of the head assembly shown in Figure 3.
Figure 7 is a diagrammatic representation of a modified form of head assembly.

The structural arrangement of the magnetic head assembly is one of the novel features of the present invention. Referring to Figures 3, 4, and 5 of the drawings, one embodiment of such head structure is shown. As shown particularly in Figure 5, each magnetic transducer head includes two U-shaped core members 46 and 47, and two inverted L-shaped core members 48 and 49. The vertical leg on each L-shaped member 48 and 49 extends down between the upstanding legs of the two U-shaped members 46 and 47 in snug nested engagement therewith. The L-shaped members 48 and 49 have their short legs projecting toward each other to form poles with a non-magnetic gap 50 lying therebetween.

The tape 32 is arranged to ride over the pole portions of the core members 48 and 49 and across the gap 50.

A signal coil 51 is mounted on one of the legs of the core structure in the manner illustrated. The erase head 30 is similar to the electromagnetic transducer heads 24 and 25 with the exception that the non-magnetic gap 52 is disposed at an acute angle with respect to the lengthwise movement of the tape 32. This may be seen clearly in Figures 1 and 3 of the drawings, where the non-magnetic gap 52 lies at an acute angle, while the gap 50 of the heads 24 and 25 is exactly at right angles to the direction of travel of the tape. This places the erase gap at an angle with respect to the gaps of the recording heads.

As may be seen best in Figures 3 and 4 of the drawings, the two electromagnetic transducer heads 24 and 25 and the erase head 30 are assembled in a two-piece housing of non-magnetic, non-conducting material, such, for example, as "Bakelite," indicated generally at 53. This housing includes a rear housing member 54 and a front housing member 55 which are provided with confronting recessed portions into which the heads 24, 25 and 30 are assembled. The upper wall of the front housing member 55 is provided with suitable openings through which the pole portion of each of the heads 24, 25 and 30 project very slightly.

Also mounted in the upper wall portion of the front housing member 55 are the two keepers 37 and 38. It will be noted that keeper 37 is arranged to lie against track 33, while keeper 38 is arranged to lie against track 34 when the tape is being moved from left to right as viewed in Figure 1 of the drawings.

In addition to the keepers 37 and 38, the keeper 39 is carried in the rear housing member 54 and lies against the tracks 35 and 36 of the tape 32, when the tape is being moved from left to right as viewed in Figure 1 of the drawings. It will be noted from an inspection of the drawings that the keepers 38 and 39 prevent the magnetic field set up by the head 24 during the recording process from influencing the adjacent channels on the tape 32, and on play-back prevents stray pick-up from the adjacent channels by head 24.

Keepers 37 and 39 prevent the magnetic field set up by the head 25 during the recording process from influencing the adjacent channels on the tape 32, and on play-back prevents stray pick-up from the adjacent channels being picked up by head 25.

The staggered arrangement of the heads 24 and 25 in conjunction with the keepers 37 and 38 also tends to greatly improve the simultaneous operation of the two heads, as is necessary in a binaural system.

Figure 6:
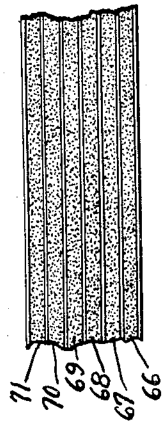
Figure 6 is a diagrammatic illustration of a modified form of tape wherein more than four magnetic tracks are employed.

In Figure 6 of the drawings, I have illustrated the tape with six channels 66, 67, 68, 69, 70 and 71 thereon, three of which will be recorded on or played back from when the tape is moved in one direction, and the other three of which are used when the tape is reversed end to end and moved back in the opposite direction.

With such an arrangement, three sets of heads will, of course, be employed, and a keeper 73 will be employed having a portion associated with each head as is illustrated in Figure 7 of the drawings. More particularly, as shown in Figure 7 of the drawings, the head assembly 56 for a six-lane tape would employ an erase head 57 which is substantially half of the width of the tape and three electromagnetic transducer heads 58, 59 and 60, which are each slightly less than a sixth of the width of the tape. A single magnetic keeper 73 is employed having integral portions 61, 62, 63, 64 and 65. The portions 61 and 64 extend in a lengthwise direction away from the head 59, while the portions 62 and 63 extend lengthwise away from the heads 60 and 58, respectively. The portion 65 is substantially half of the width of the tape and extends across the whole head assembly as shown in Figure 7.

It will be observed that the head 59 lies in opening 72 in the keeper 73, and thus the head 59 is completely surrounded by a magnetic keeper. This is a particularly effective type of shielding and may be employed with one or more heads.

With an arrangement such as illustrated in connection with Figures 6 and 7 of the drawings, it will, of course, be understood that each of the electromagnetic transducer heads 58, 59 and 60 will have a microphone and a sound reproducing means associated therewith, such as the microphone 10 and the sound reproducing means 44 of Figure 1.

In the foregoing specification and the accompanying claims, I have used the term "paramagnetic" to designate a material having a high value of magnetic permeability as compared to air such as, for example, soft iron.

While I have shown certain particular embodiments of my invention, it will, of course, be understood that I do not wish to be limited thereto, since many modifications may be made, and I, therefore, contemplate by the appended claims to cover all such modifications as wall within the true spirit and scope of my invention.

I claim as my invention:

1. An electromagnetic transducer head assembly comprising a magnetic record member supporting means along which a record member is arranged to travel, a pair of electromagnetic transducer heads mounted in said assembly and spaced both laterally and longitudinally with respect to each other, a paramagnetic member alongside each of said heads and longitudinally aligned with the other of said heads, whereby each of said heads is associated with a different longitudinal region of said record member, and whereby each of said heads is substantially isolated to its associated longitudinal region of said record member.

2. An electromagnetic transducer head assembly comprising a magnetic record member guiding and supporting means including a supporting surface along which a record member is arranged to travel, a pair of electromagnetic transducer heads mounted in said assembly and spaced both laterally and longitudinally with respect to each other, said heads each including a pair of polar portions separated from each other by a non-magnetic gap, said polar portions having a supporting surface forming at least part of the supporting surface of said supporting means, a paramagnetic member alongside each of said heads and forming a part of said supporting surface of said supporting means and longitudinally aligned with the other of said heads, whereby each of said heads is associated with a different longitudinal region of said record member and whereby each of said heads is substantially isolated to its associated longitudinal region of said record member.

3. An electromagnetic transducer head assembly comprising a magnetic record member supporting means along which a record member is arranged to travel, a pair of electromagnetic transducer heads mounted in said assembly and spaced both laterally and longitudinally with respect to each other, a paramagnetic member alongside each of said heads and longitudinally aligned with the other of said heads, whereby each of said heads is associated with a different longitudinal region of said record member, and whereby each of said heads is substantially isolated to its associated longitudinal region of said record member, said heads and said paramagnetic members being dimensioned and positioned so as to cover substantially one-half of the width of the record member which the head assembly is arranged to receive.

4. An electromagnetic transducer head assembly comprising a magnetic record member supporting means along which a record member is arranged to travel, a pair of electromagnetic transducer heads mounted in said assembly and spaced both laterally and longitudinally with respect to each other, a paramagnetic member alongside each of said heads and longitudinally aligned with the other of said heads, whereby each of said heads is associated with a different longitudinal region of said record member, and whereby each of said heads is substantially isolated to its associated longitudinal region of said record member, said heads and said paramagnetic members being dimensioned and positioned so as to cover substantially one-half of the width of the record member which the head assembly is arranged to receive, and a third paramagnetic member lying alongside of said head and said paramagnetic member which lie closest to the center line of travel of said record member, said third paramagnetic member underlying substantially the other half of the width of said record member.

5. An electromagnetic transducer head assembly comprising a magnetic record member supporting means along which a record member is arranged to travel, a pair of electromagnetic transducer heads mounted in said assembly and spaced both laterally and longitudinally with respect to each other, a paramagnetic member alongside each of said heads and longitudinally aligned with the other of said heads, whereby each of said heads is associated with a different longitudinal region of said record member, and whereby each of said heads is substantially isolated to its associated longitudinal region of said record member, said heads and said paramagnetic members being dimensioned and positioned so as to cover substantially one-half of the width of the record member which the head assembly is arranged to receive, and an erase head lying opposite the end of one of said paramagnetic members and the head which lies alongside said last mentioned paramagnetic member, said erase head covering substantially one-half of the width of the record member which the head assembly is arranged to receive.

6. An electromagnetic transducer head assembly comprising a magnetic record member supporting means along which a record member is arranged to travel, a pair of electromagnetic transducer heads mounted in said assembly and spaced both laterally and longitudinally with respect to each other, a paramagnetic member alongside each of said heads and longitudinally aligned with the other of said heads, whereby each of said heads is associated with a different longitudinal region of said record member, and whereby each of said heads is substantially isolated to its associated longitudinal region of said record member, said heads and said paramagnetic members being dimensioned and positioned so as to cover substantially one-half of the width of the record member which the head assembly is arranged to receive, and an erase head lying opposite the end of one of said paramagnetic members and the head which lies alongside said last mentioned paramagnetic member, said erase head covering substantially one-half of the width of the record member which the head assembly is arranged to receive, and a third paramagnetic member lying alongside of said erase head as well as the one of said transducer heads and paramagnetic member which lie closest to the center line of the path of travel of said record member, said third paramagnetic member underlying substantially the other half of the width of said record member.

7. An electromagnetic transducer head for operation in conjunction with a magnetic record medium capable of accommodating a plurality of spaced tracks, said head including a pair of paramagnetic core members each defining a non-magnetic gap and having portions adjacent thereto to receive said medium, said portions of one of said core members extending over substantially the width of one of said tracks and said portions of the other of said core members extending over substantially the width of the other of said tracks, and a pair of paramagnetic keeper members in engagement with said medium, one of said members being in longitudinal alignment with said first core member and extending over said other track and the other of said keeper members being in longitudinal alignment with said other core member and extending over said one track, said keepers each being spaced laterally of the associated core member.

MARVIN CAMRAS.

REFERENCES CITED

The following references are of record in the file of this patent:

UNITED STATES PATENTS

| Number | Name | Date |
|---|---|---|
| 1,971,028 | Bothe | Aug. 21, 1934 |
| 2,089,287 | Malloy | Aug. 10, 1937 |
| 2,144,844 | Hickman | Jan. 24, 1939 |
| 2,167,188 | Schaarachter | July 25, 1939 |
| 2,229,326 | Heller | Jan. 21, 1941 |
| 2,335,277 | Heller | Nov. 30, 1943 |
| 2,361,752 | Eilenberger | Oct. 31, 1944 |

FOREIGN PATENTS

| Number | Country | Date |
|---|---|---|
| 19,133 | Australia | Jan. 28, 1930 |
| 316,654 | Great Britain | Aug. 2, 1929 |
| 701,552 | Germany | Jan. 18, 1941 |
| 884,881 | France | Aug. 30, 1943 |